US006919993B2

(12) United States Patent
Honda

(10) Patent No.: US 6,919,993 B2
(45) Date of Patent: Jul. 19, 2005

(54) SCANNING LENS AND SCANNING OPTICAL DEVICE

(75) Inventor: Satoru Honda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/740,577

(22) Filed: Dec. 22, 2003

(65) Prior Publication Data

US 2004/0130800 A1 Jul. 8, 2004

(30) Foreign Application Priority Data

Dec. 26, 2002 (JP) .................................... 2002-375926

(51) Int. Cl.⁷ .......................... G02B 3/00; G02B 26/08
(52) U.S. Cl. ...................... 359/662; 359/642; 359/206
(58) Field of Search ................................ 359/717, 796, 359/662, 668, 642, 205, 206, 207, 900, 212, 223

(56) References Cited

U.S. PATENT DOCUMENTS 5,280,379 A * 1/1994 Sugiura ..................... 359/217
6,181,455 B1 * 1/2001 Ishihara ..................... 359/196
6,324,015 B1 * 11/2001 Fuse .......................... 359/662

FOREIGN PATENT DOCUMENTS

JP 9-329755 12/1997

* cited by examiner

Primary Examiner—Georgia Epps
Assistant Examiner—M. Hasan
(74) Attorney, Agent, or Firm—Pillsbury Winthrop Shaw Pittman LLP

(57) ABSTRACT

A scanning lens molded with resin is disclosed. The lens has a first lens surface which a light beam incident to, and a second lens surface which emits the light beam. The lens further includes a first lens frame formed to project from the first lens surface, the first lens frame is provided on at least a part of the periphery of the first lens surface. The lens further includes a second lens frame formed to project from the second lens surface. The second lens frame is provided on at least a part of the periphery of the second lens surface. At least one of the first and second lens frames has approximately constant projection amount along with the main-scanning direction of the scanning lens.

18 Claims, 9 Drawing Sheets

SCANNING LENS AND SCANNING OPTICAL DEVICE

CROSS REFERENCE TO RELATED APPLICATION

This application is based upon and claims the benefit of priority from the prior Japanese Patent Application No. 2002-375926 filed on Dec. 26, 2002;

the entire contents of which are incorporated herein by reference.

FIELD OF THE INVENTION

The present invention relates to a scanning lens, and more particularly to a lens which has a lens frame to protect the lens surface. The invention further relates to a scanning optical device having a scanning lens.

DESCRIPTION OF THE BACKGROUND

FIG. 11A shows a schematic plane view of an inside of a known optical scanning device such as an electronic copier, a laser beam printer, or a laser facsimile equipment. FIG. 11B shows an oblique drawing of a scanning lens being used in the optical scanning device.

As shown in FIG. 11A, the optical scanning device is provided with a light source unit 1, a rotary polygon mirror 2, and a scanning lens 4.

Light source unit 1 includes elements such as a semiconductor laser or a collimate lens. Rotary polygon mirror 2 as a scanning. means scans a parallel laser beam L1 emitted from light source unit 1. The scanned laser beam L1 passes through a reflection mirror. Scanning lens 4 focuses the parallel beam L1 to form an image on a photosensitive body on a rotary drum (not shown).

Rotary polygon mirror 2 and scanning lens 4 are housed inside an optical box 5, and light source unit 1 is secured to a sidewall of optical box 5.

After assembling the parts including light source unit 1, rotary polygon mirror 2 and so forth inside optical box 5, an upper-part opening of optical box 5 is capped with a lid (not shown).

A window 6 is provided on a sidewall of optical box 5. The light beam L1 scanned by rotary polygon mirror 2 goes through window 6 toward rotary drum (not shown) arranged out of optical box 5.

A collimate lens (not shown) collimates laser beam L1 emitted from a semiconductor laser of light source unit 1. A cylindrical lens 1a converges the collimated laser beam L1 into a linear light beam on a reflecting surface of rotary polygon mirror 2. Reflection mirror 3 reflects laser beam L1 from rotary polygon mirror 2 and scanning lens 4 to rotary drum (not shown). The reflected laser beam L1 go through window 6 of optical box 5.

Consequently, the light beam L1 is focused into images on the photosensitive body on the rotary drum. The light beams form electrostatic latent images as the main-scanning rotation by rotary polygon mirror 2 and the sub-scanning rotation by the rotary drum are carried out.

Scanning lens 4 corrects distortions of point images which are formed on the photosensitive body. It is because scanning lens 4 performs as a so-called f-theta lens. Scanning lens 4 is an axially asymmetrical aspherical lens and is integrally molded with plastic.

As shown in FIG. 11B, a lens frame 4x is arranged on the bottom portion of scanning lens 4. Lens frame 4x projects from both sidewalls of scanning lens 4 respectively, and another lens frame 4y is arranged on the upper portion of scanning lens 4. Lens frame 4y projects from both sidewalls of scanning lens 4 respectively. A lens surface (effective-surface) 4c of scanning lens 4 is provided between lens frame 4x and lens frame 4y.

Furthermore, scanning lens 4 has a pair of projecting parts 11, at the center of flanges 4x and 4y in the longitudinal direction of flange 4x and 4y. Flanges 4x and 4y respectively projects in the direction of the optical axis of scanning lens 4. One of projecting parts 11 is held between a pair of positioning members 16a and 16b. Positioning members 16a and 16b projects from the bottom wall of optical box 5, and position scanning lens 4 in the main-scanning direction of scanning lens 4e.

In addition, a bottom wall 13 of scanning lens 4 is finished with high flatness as a horizontal reference surface for accurate positioning.

Bottom wall 13 of scanning lens 4 contacts with a pair of horizontal pedestal parts (not shown) which project from the bottom wall. Bottom wall 13 and the pair of horizontal pedestal parts positions scanning lens 4 in the sub-scanning direction of scanning lens 4.

A pair of positioning ribs 14 and 15 are formed on both the side edges of scanning lens 4 respectively. Positioning ribs 14 and 15 have vertical reference surface parts which are perpendicular to the optical-axis direction of scanning lens 4. Positioning ribs 14 and 15 contact with a pair of vertical surface (not shown) provided on a sidewall or a partition wall of optical box 5. Positioning ribs 14 and 15 position scanning lens 4 in the optical-axis direction of scanning lens 4.

When scanning lens 4 is assembled with in optical box 5, one of projecting parts 11 is hold between positioning members 16a and 16b which are provided at the bottom of optical box 5. The horizontal reference surface provided at bottom wall 13 of scanning lens 4 is contacted with the horizontal pedestal parts of optical box 5. Positioning ribs 14 and 15 are respectively contacted with the vertical surfaces parts of optical box 5. Thus, scanning lens 4 is positioned in the main-scanning direction, in the sub-scanning direction, and in the optical-axis direction. After the positioning, scanning lens 4 is fixed on the bottom wall of optical box 5 with conventional ways, such as using adhesives or springs.

It is important to position scanning lens 4 in the main-scanning direction, the sub-scanning direction, and the optical-axis direction against rotary polygon mirror 4 in order to provide good images. The scanning lens mentioned above is described in Japanese Patent Publication (Kokai) No. 09-329755.

FIG. 12A and FIG. 12B respectively show a plane and front view of another type of known scanning lens. As shown in FIG. 12A, a positioning protrusion 11a may be provided on only single sidewall of scanning lens 4a at the center of scanning lens 4a. End parts 25a, which are provided at both ends in the main-scanning direction of scanning lens 4a may be positioned by pins (not shown), for example, provided on an optical box 5. The pins serves to prevent end parts 25a from moving to position scanning lens 4a in the predetermined direction.

Further, FIG. 13A is a cross section of another type of known lens, and FIG. 13B shows a plane view of the lens.

A lens flame 19 is provided to surround lens part 18. Projection 11a provided at the center in the scanning direction of lens 4b positions a scanning lens 4b. Moreover, lens flame 19 prevents lens surface from being damaged in transporting, and from varying the optical characteristics owing to water vapor absorption from the sidewalls of lens 4b.

It is difficult for the scanning lens shown in FIGS. 12A and 12B to protect a lens surface in transporting and to prevent optical characteristics from varying owing to water vapor absorption.

The scanning lens shown in FIGS. 13A and 13B causes a problem, which is described below.

Firstly, the thickness of lens part 18 is not uniform in the scanning direction, while the thickness of lens frame 19 is uniform in the scanning direction. Thus, in comparing the cross sectional area ratio of lens part 18 with that of lens frame 19, the cross sectional area of lens part 18 relative to lens flame 19 at the center in the scanning direction is larger than that at the end parts in the scanning direction.

FIG. 15 describes resin fluidity in resin molding depending on cross sectional area as mentioned above.

When resin is inserted through a gate G, and pressure is applied to the resin, the tip portion of inserted resin flow ununiformly in the scanning direction. The tip shape of the inserted resin is quite different at the end part from that at the center part.

For example, at the end part in the scanning direction, the resin in lens frame 19 flows faster than the resin in lens part 18, while at the center part in the scanning direction where lens part 18 thickens, the resin flows faster in lens part 18 than in lens flame 19.

Consequently, ununiform fluidity of resin tip produces flow marks FM or rapid change of internal strain, etc., which deteriorate optical characteristics of lenses.

Moreover, providing a projection 11a shown in FIG. 12A and FIG. 13B widens and heightens a lens.

Further, scanning lens 4 shown in FIG. 11 has lens frames 4x and 4y whose projection amount from the lens surface partially vary relatively much in the main-scanning direction as shown in FIG. 11A. Consequently, flow marks or rapid change of internal strain, etc. may occur which deteriorate optical characteristics of lenses.

SUMMARY OF THE INVENTION

One aspect of the present invention is to provide a scanning lens, which comprises a first a first lens surface for receiving a light beam; a second lens surface for emitting the light beam; a first lens frame that projects an approximately constant amount from a substantial part of the periphery of the first lens surface along a main scanning direction of the scanning lens; and a second lens frame that projects from a periphery of the second lens surface.

Another aspect of the present invention is to provide an optical scanning device for producing image information, the device comprising: a light source which emits a light beam; a scanning element which scans the light beam; a scanning lens which refracts the light beam, the scanning lens having a first lens surface; and a first lens frame that projects an approximately constant amount from a substantial part of the periphery of the first lens surface.

Further another aspect of the present invention is to provide a method of making a scanning lens comprising: forming a lens part having a first lens surface and a second lens surface; forming a first lens frame to project an approximately constant amount from a substantial part of the periphery of the first lens surface along a main scanning direction; and forming a second lens frame to project from the periphery of the second lens surface.

DETAILED DESCRIPTION OF THE INVENTION

A scanning lens and an optical scanning device according to a first embodiment in accordance with the present invention, will be explained below with reference to FIGS. 1 to 3.

Figure 11A:
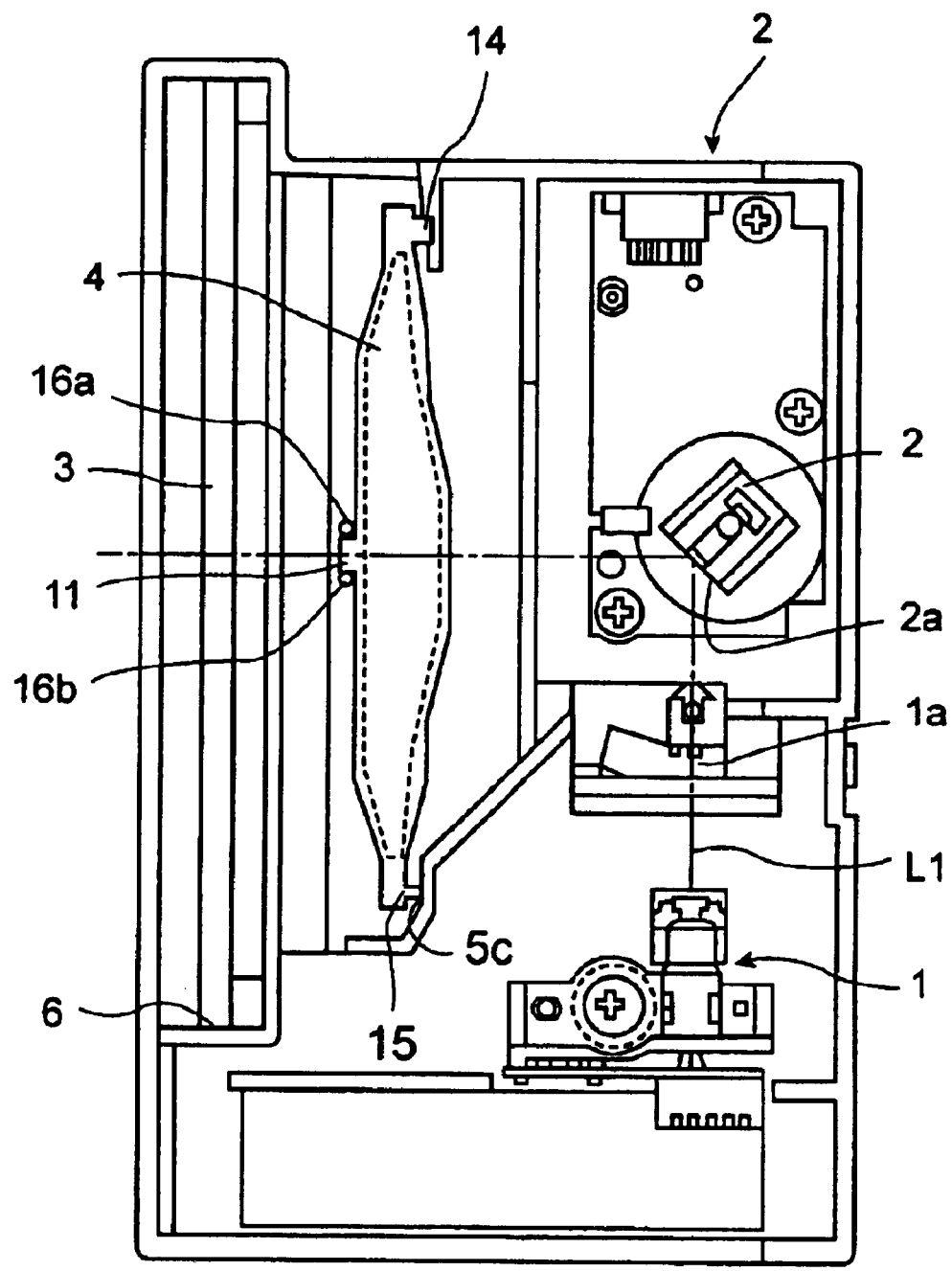
FIG. 11A is a schematic plane view an inside of a known optical scanning device.
Figure 11B:
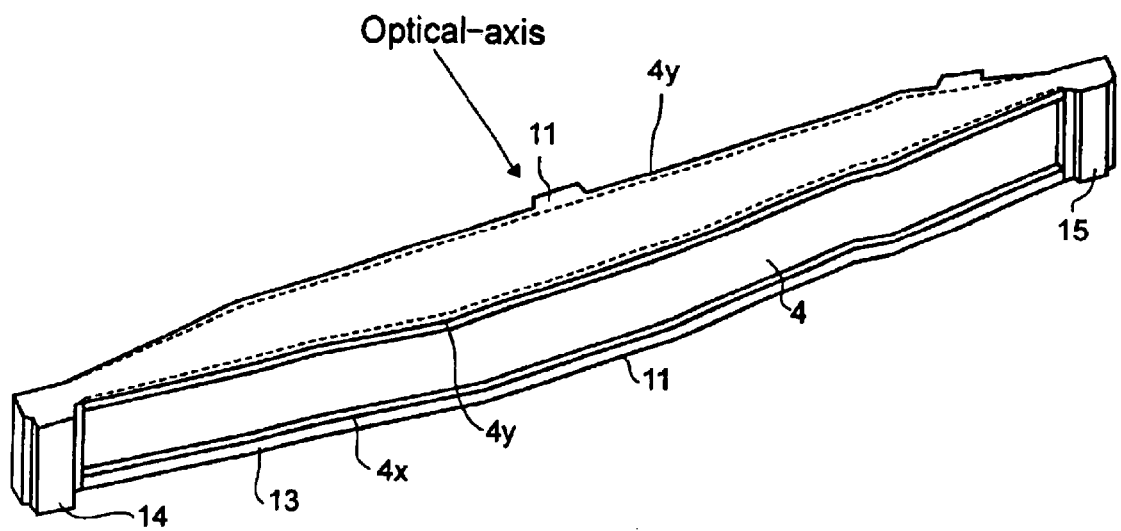
FIG. 11B is an oblique view of the scanning lens being used in known optical scanning device.
Figure 12A:
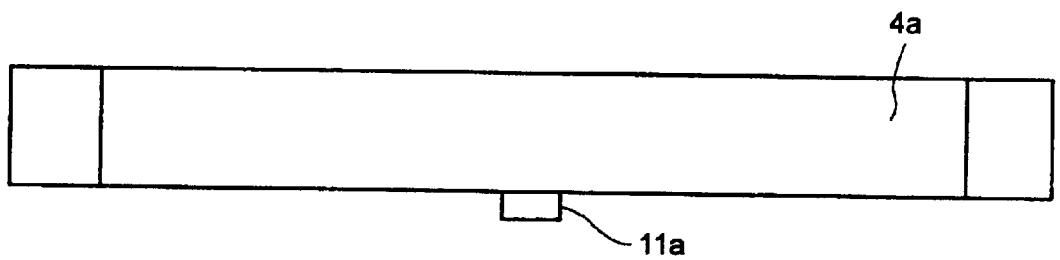
FIG. 12A is a plane view of another known scanning lens.
Figure 12B:
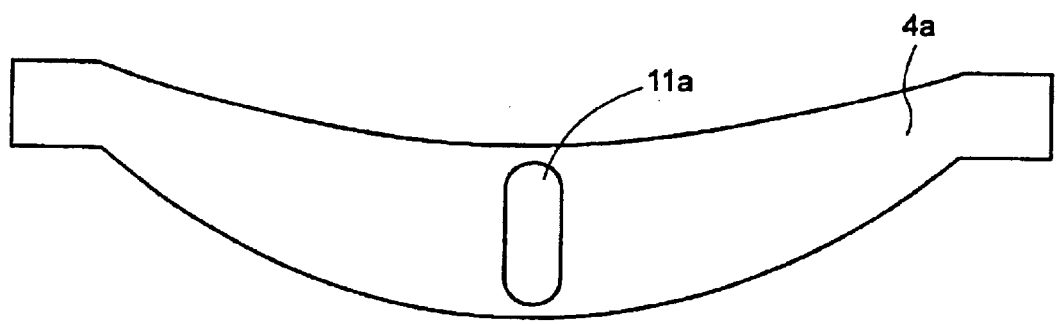
FIG. 12B is a front view of the conventional scanning lens shown in FIG. 12A.

The optical scanning device of the first embodiment has structures which are common with the optical scanning device shown in FIG. 11A, except the structure of the scanning lens.

Thus, detailed description about the optical scanning device is omitted except for the scanning lens to avoid repeated description. Some of the reference marks used in the description on the background of the invention are also cited in this modification.

Figure 15:
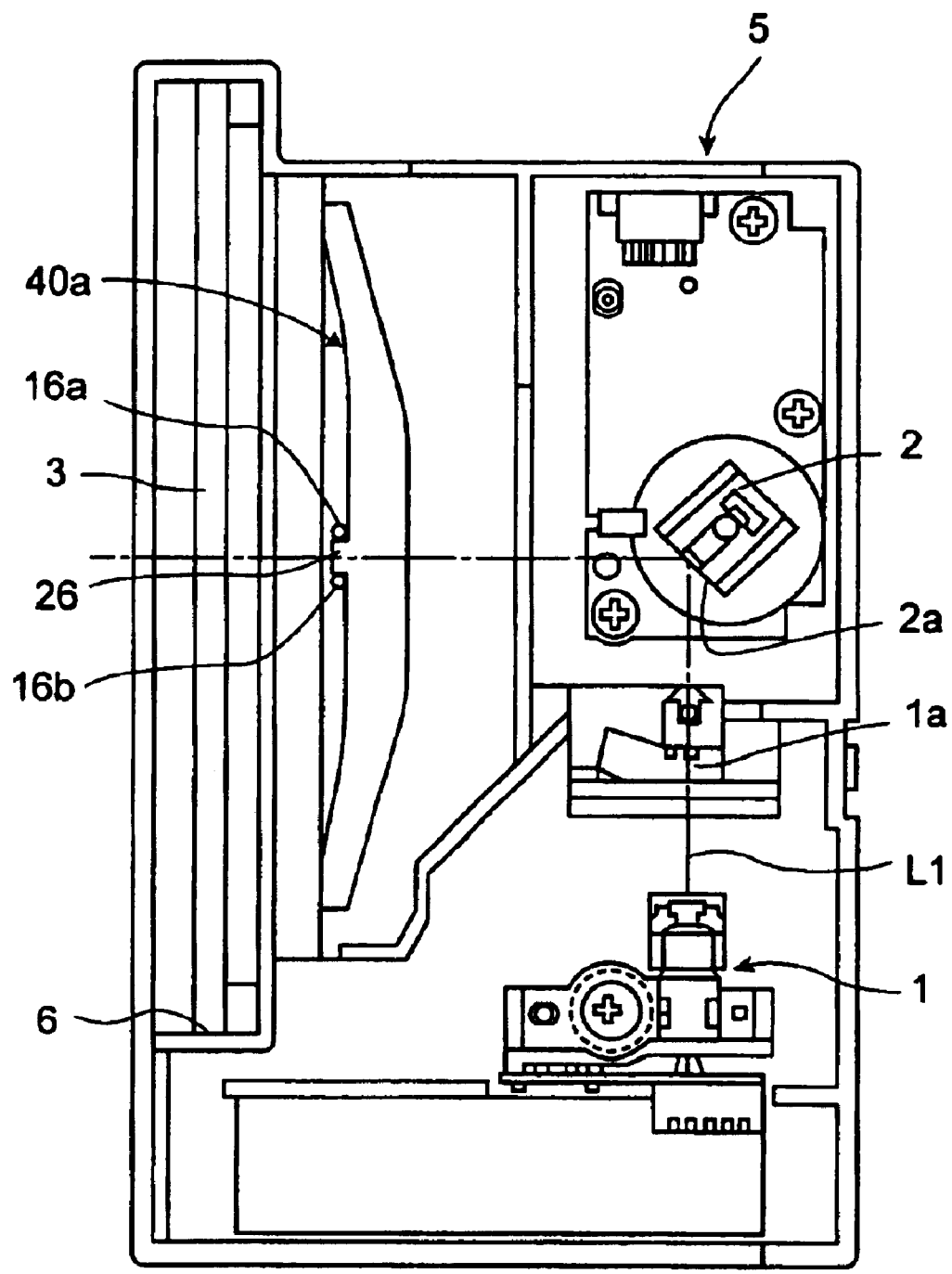
FIG. 15 shows a plane view of an optical scanning device according to the present invention.

FIG. 15 shows a plan view of an optical scanning device according to the present invention.

As shown in FIG. 15, the optical scanning device is provided with a light source unit 1, a rotary polygon mirror 2, and a scanning lens 4.

Rotary polygon mirror 2 as a scanning element scans a parallel laser beam L1 emitted from light source unit 1. The scanned laser beam L1 passes through a reflection mirror. Scanning lens 4 focuses the parallel beam L1 to form an image on a photosensitive body on a rotary drum (not shown).

Rotary polygon mirror 2 and scanning lens 4 are housed inside an optical box 5, and light source unit 1 is secured to a sidewall of optical box 5.

A collimate lens (not shown) collimates laser beam L1 emitted from a semiconductor laser of light source unit 1. A cylindrical lens 1a converges the collimated laser beam L1 into a linear light beam on a reflecting surface of rotary polygon mirror 2. Reflection mirror 3 reflects laser beam L1 from rotary polygon mirror 2 and scanning lens 4 to rotary drum (not shown). The reflected laser beam L1 go through window 6 of optical box 5.

Consequently, the light beam L1 is focused into images on the photosensitive body on the rotary drum. The light beams form electrostatic latent images as the main-scanning rotation by rotary polygon mirror 2 and the sub-scanning rotation by the rotary drum are carried out.

Figure 1:
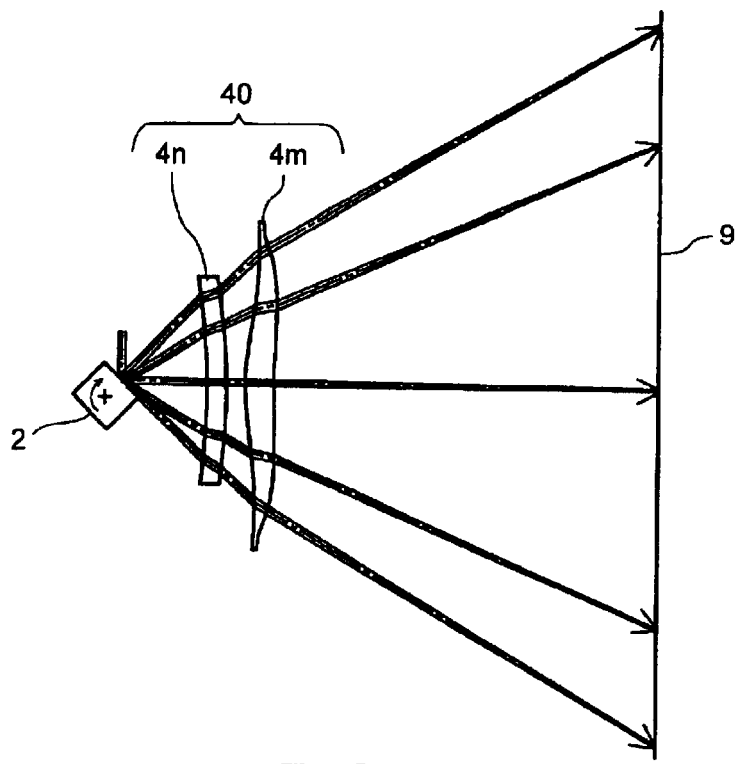
FIG. 1 is a plane view of an optical scanning device having two scanning lenses 4n and 4m.

The optical scanning device of the first embodiment may have two scanning lens 4n and 4m, which have what is called the "f-theta characteristic" as shown in FIG. 1.

Resin lens 4n may be a scanning spherical lens ("θ1 lens") with positive refracting power. Resin lens 4m ("θ2 lens") may be a resin aspherical toric lens. Lenses 4n and 4m are simply called as scanning lenses in general. Lens 4m has refracting powers of the main-scanning direction different from of the sub-scanning direction.

A light beam modulated according to image information is scanned by a rotary polygon mirror 2. The two lenses 4n and 4m focus into images on a surface of a photosensitive drum 9 as a photosensitive body, the lenses 4n and 4m compensate for plane tilt of polygon mirror 2.

Scanning lens may be made of plastic such as PNMA which is cheap plastic. The scanning lens further may be a compound lens with the f-theta function, which uniforms the scanning speed of a point image focused on the surface of the photosensitive body.

Scanning lenses 4n and 4m are fixed on an optical box adhesives, for example, and are strictly positioned with respect to the optical path of the light beam which is reflected by polygon mirror 2.

Detail description on scanning lenses applicable to the optical scanning device of the first embodiment is mentioned below.

Figure 2A:
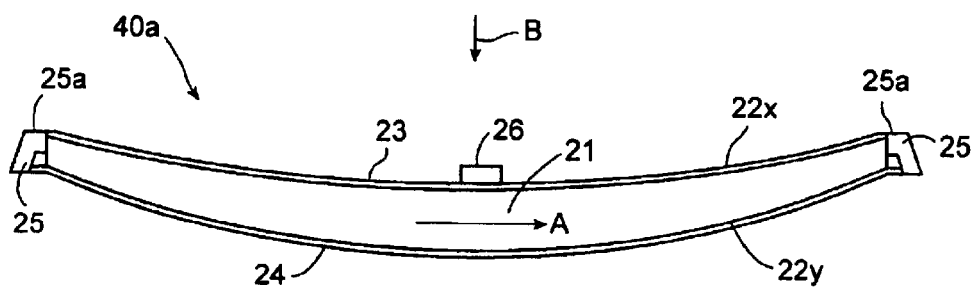
FIG. 2A is a cross sectional view of a first embodiment of a scanning lens according to the present invention.
Figure 2B:
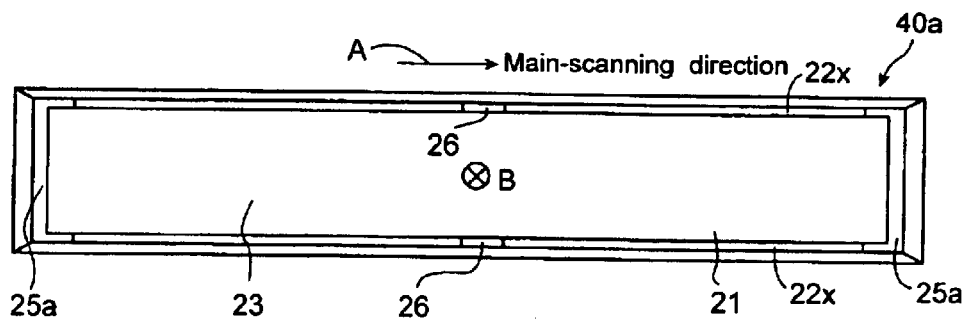
FIG. 2B is a plane view of the first embodiment of the scanning lens shown in FIG. 2A.

FIG. 2A is a cross section of scanning lens 40a of the first embodiment of the present invention, and FIG. 2B shows a plane view of the same. As shown in 2B, scanning lens 4B is almost rectangular having two long sides and short sides. An arrow A and an arrow B respectively show the main-scanning direction and the optical-axis direction of scanning lens 40a. In a molding process, resin flows in the main-scanning direction inside a die to produce scanning lens 40a. A lens part 21 and a lens flame 22 are integrally molded with resin.

In the present invention, "the main-scanning direction" means the direction in which scanning means such as a polygon mirror scans a light beam. The main-scanning direction is consistent with the longitudinal direction of scanning lens 40a. Further, "the sub-scanning direction" means the direction perpendicular to the main-scanning direction. The sub-scanning direction is consistent with the direction parallel with the short sides of scanning lens 40a. Furthermore, the optical-axis direction of scanning lens 40a is perpendicular to both the main-scanning direction and sub-scanning direction.

As shown in FIG. 2A, the center part of lens part 21 in the main scanning direction is thicker than the end parts of lens part 21. A lens surface 23 as a first lens surface 23 is a surface for receiving a light beam. A second lens surface 24 as a second lens surface 24 is a surface which emits the light beam. Both of the lens surfaces 23 and 24 form free curved surfaces.

It is difficult to represent a free curved surface, including surfaces 23 or 24, with a single mathematical model. A free curved surface can be represented by interpolating with many mathematical models.

The center part in the sub-scanning direction of lens surface 23 is recessed, while the center part in the main-scanning direction of lens surface 23 is protruded. Lens surface 23 has a fine convexo-concave as a whole. Lens surface 24 is convex in both the main-scanning direction and sub-scanning direction. Lens surface 24 has a fine convexo-concave as a whole.

As shown in FIG. 2B, lens frames 22x as a first lens frames 22x are provided on two parallel sides of the periphery of lens surface 23. The both sides are parallel with main-scanning direction A. Lens frames 22x are formed to project from lens surface 23, while a lens frames 22y as a second lens frames 22y are provided on two parallel sides of the periphery of lens surface 24, and are formed to project from lens surface 24. The both sides are parallel with main-scanning direction A.

Further, outer edges of lens frames 22x and 22y respectively form a curved line with a constant curvature along with main-scanning direction A. The curvature of lens frame 22x is approximately the same as the curvature of a curved line which approximates lens surface 23. The curvature of lens frame 22y is approximately the same as the curvature of a curved line which approximates second lens surface 24.

The curvature of lens frames 22x is slightly smaller than the curvature of a line which approximates the center section line of lens surface 23 a free curved line.

On the other hand, the curvature of lens frame of a beam output side is slightly larger than the curvature of a line which approximates the center section line of lens surface 24 with a free curved line.

Both lens frames 22x and 22y have an inflection point near the center part in the main-scanning direction. The curvature is approximately zero at the vicinity of the center part in the main-scanning direction. Consequently, lens frame 22x has the most recessed position at the vicinity of the center part in the main-scanning direction, while lens frame 22y has the most protruded position at the vicinity of the center part in the main-scanning direction.

Consequently, each frame of lens frames 22x and 22y projects an approximately constant amount from each lens surface. Each lens frame 22x or 22y is provided on the lens surface along with main-scanning direction A. At any position in the main-scanning direction, lens frame 22x has its height higher than the highest point of lens surface in the main-scanning direction by 2 mm or less. At any position in the main-scanning direction, lens frame 22y has its height higher than the highest point of lens surface in the main-scanning direction by 2 mm or less Thereby, the change of perpendicular sectional area ratio between lens part 21 and lens frames 22 in the main-scanning direction can be within a certain predetermined range.

Hence, the tip part of injected resin flows uniformly inside the die to make molding scanning lens 40a. Consequently, lens part 21, which is a part of the molded article, is prevented from producing flow marks or from rapid change of internal strain. As a result, a scanning lens with good optical characteristics is provided.

If a lens frame has its height higher than the highest point of a lens surface by over 2 mm, the structure causes a large difference between a flow tip position apart from the lens frame and a flow tip position close to the lens frame in a molding process. It may cause defects such as flow marks, etc.

In addition, because lens frames 22x and 22y form a curved line extending to the main-scanning direction with a constant curvature, it is easy to produce a die to fabricate the scanning lens 4. Consequently, the cost for producing a scanning lens may be reduced.

End parts 25 having a flat surface parallel to the main-scanning direction (shown as an arrow mark A in FIG. 2B) are provided on both ends in the direction A of lens part 21. Because the surface of end parts 25 is formed so as to be orthogonal or perpendicular to the optical-axis direction, lens part 21 is positioned with optically high precision by making use of end parts 25 as a guide surface in attaching scanning lens 4.

A positioning protrusion 26 with a surface parallel with the direction A may be provided at the center part in the scanning direction of first lens frame 22x or at an original position for optical design.

As shown in FIG. 2A, in the optical-axis direction, positioning protrusion 26 is formed on lens frame 22x so that the height of any portion of lens frame 22x is lower than the end parts of end parts 25 extending in the main-scanning direction. In other words, positioning protrusion 26 is between the periphery of lens surface 23 and a plane including opposite end points of the lens surface 23.

Thus, the height of scanning lens 40a depends on the height of lens frame 22 in the optical axis direction. This makes it possible to reduce the height of scanning lens 40a. As a result, both downsizing of scanning lens 40a and accurate positioning of scanning lens 40a are made possible.

Moreover, making use of both positioning projection 26 and end parts 25 as guides makes possible more accurate positioning.

Making the height of positioning projection 26 same as the height of end parts 25 may simplify structures of a housing to which the scanning lens 40a is attached, and may makes it possible to position much more accurately by making use of both parts 25 and 26 as guides.

The scanning lens may be formed without end part 25 or protrusion 26. Moreover, positioning protrusion 26 may be provided on another portion of the scanning lens in place of the center of the scanning lens. For example, protrusion 26 may be provided on a sidewall of lens frame 22 projecting in the sub-scanning direction. The lens frame may be formed into other kinds of lines with a curvature along with the main-scanning direction. For example, a curved line which is represented by higher order polynomials, such as a two-order curved line (expressed by a quadratic equation), a three-order curved line (expressed by a cubic equation), a four-order curved line (expressed by a biquadratic expression) , or a part of ellipse, etc. may be applicable.

Lens part 21 and lens frames 22 may be made without using resin. For example, Lens part 21 may be made of glass.

Lens frames 22 may project no more than 2 mm from lens surface 23 or 24, or lens frames 22 may project over 2 mm.

Further, another scanning element instead of polygon mirror 2 may be applicable.

Further another, a scanning mirror instead of scanning lens 40a may be applicable. In detail, a scanning mirror comprising a first lens surface for reflecting a light beam, and a first lens frame that projects an approximately constant amount from a substantial part of the periphery of the first lens surface along a main-scanning direction of the mirror, may be applicable.

The optical scanning device of the present invention may have a structure such as the structures of various known devices except for the scanning lens.

Modifications of the first embodiment of scanning lens 40a are described below. In the modifications the shape of lens part 21 may be the same as that of the first embodiment mentioned above.

(First Modification)

Figure 3:
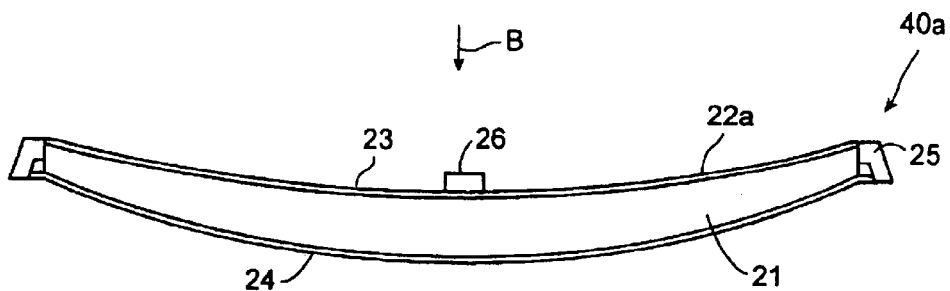
FIG. 3 is a cross-sectional view of a first modification of the scanning lens according to the present invention.

FIG. 3 is a cross section of a modification of scanning lens 40a. In scanning lens 40a mentioned above, lens frames 22x and 22y form a curved line with a constant curvature along with the main-scanning direction.

In this modification, a lens frame 22a is formed with plural line segments with different angles along the main-scanning direction. Each segment approximates a section line in the main-scanning direction of lens surfaces 23, which is a free curved surface. Thus, a die for a scanning lens 40b of the first modification, is easily made. Consequently, cost for producing a scanning lens may be reduced.

Moreover, the change of perpendicular sectional area ratio between lens part 21 and lens frame 22a may be restricted within a predetermined range in the main-scanning direction in this modification, too. Hence, lens part 21, which is a part of the molded article, is prevented from causing a flow mark and rapid change of internal strain. As a result, a lens with good optical characteristics is provided.

In addition, end parts 25 having a surface orthogonal to the optical-axis direction and parallel to the main-scanning direction are provided on both ends of lens frame 22a. Because end parts 25 are perpendicular to the optical-axis direction (shown as an arrow mark B), lens part 21 is positioned with optically precision by making use of end parts 25 as a guide surface in attaching scanning lens 40b.

Moreover, positioning protrusion 26 is provided at the center in the scanning direction of lens frame 22a or at an original position for optical design. As shown in FIG. 3, positioning protrusion 26 is provided not to project from the highest part, which is end parts 25, in the optical-axis direction of lens frame 22.

Consequently, the height of scanning lens 40b in the optical axis direction depends on the height of lens part 21, which makes it possible to reduce height of lens unit and which makes possible both downsizing of scanning lens 40b and accurate positioning of scanning lens 40b.

(Second Modification)

Figure 4:
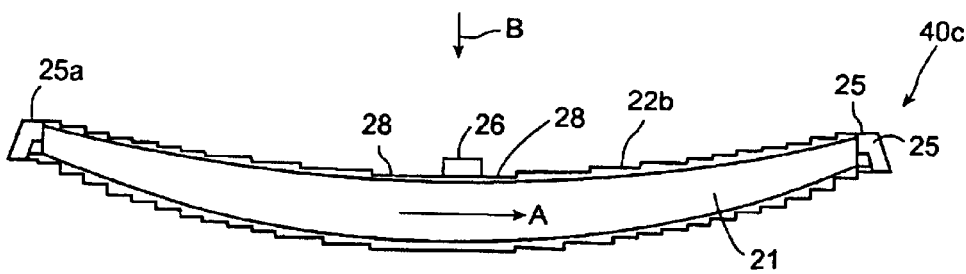
FIG. 4 is a cross-sectional view of a second variation of the scanning lens according to the present invention.

FIG. 4 is the cross section of the second modification of the scanning lens 40a. In the first modification described above, lens frame 22a is formed with plural line segments of different angles, while in this modification, a lens frame 22b replaces a free curved surface of lens part 21 with a stepped approximation. Hence, a lens frame 22b is formed with plural steps.

According to the second modification, a die with which a scanning lens 40b is molded is easily worked and cost of the die may be reduced.

A positioning protrusion 26 is provided at the center in the scanning direction of lens frame 22b or at an original position for optical design. Further, flat surface parts 28 parallel with the main-scanning direction are provided on the both sides of positioning protrusion 26.

In the modification, the change of perpendicular sectional area ratio between lens part 21 and lens frame 22b may be restricted to the predetermined range in the main-scanning direction, too. Thus, a flow mark and rapid change of internal strain are prevented. As a result, a lens with good optical characteristics is provided.

In the second modification, end parts 25 are provided on the both ends of lens frame 22b. Because end parts 25 have a flat surface which is perpendicular to the optical-axis direction, so that lens part 21 is positioned with optical precision by making use of end parts 25 as a guide surface in attaching scanning lens 40c.

Further, not only an affection of dimensional inaccuracy of a housing to which scanning lens 40c is fixed but also a tilt or a deformation of lens 40c are prevented by making use of flat surface 28 as a guide surface in attaching scanning lens 40c. It is because flat surface part 28 which is parallel with the main-scanning direction is provided on the both sides of positioning protrusion 26.

(Third Modification)

Figure 5A:
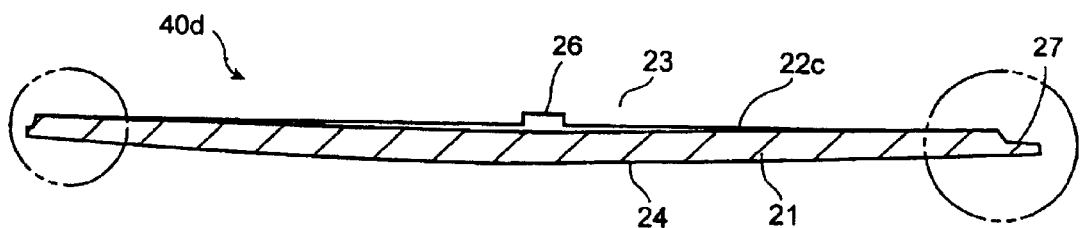
FIG. 5A is a cross sectional view of a third modification of the scanning lens according to the present invention.
Figure 5B:
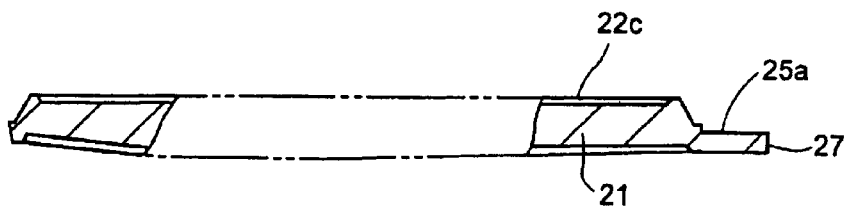
FIG. 5B is an enlarged view of end parts of the third modification of the scanning lens according to the present invention.

FIG. 5A shows a cross-sectional view of the third modification of scanning lens 40a, and FIG. 5B shows an enlarged view of the both end parts in the main-scanning direction of the third modification. The third modification of scanning lens 40d has a characteristic shape at the end parts. Lens part 21 and lens frame 22c except the end parts may be applicable to the first embodiment, the first or the second modification of lens 40a mentioned above. Some of the reference marks used in the embodiment or the modifications are also cited in this modification.

As for the shape of the end parts, a flange 27 for guiding position, which flange has a flat surface orthogonal to the optical-axis direction and parallel to the main-scanning direction is provided only at one end part. Hence, any flange is not provided at the other end part of lens part 23. Flange 27 on light-entering side has a flat surface 27a with a predetermined area. Flat surface 27a is used as a surface for guiding position. A light-exiting side of flange 27 does not need to be formed in a specific shape. For example, flat surface 27a may be formed like a circular arch as ever.

In the modification, flat surface 27a for guiding position is formed on light-entering side of flange 27. Thus, facing flat surface 27a to the mounting surface of housing-unit (not shown) makes scanning lens 40d possible to position with optical accuracy.

(Fourth Modification)

Figure 6A:
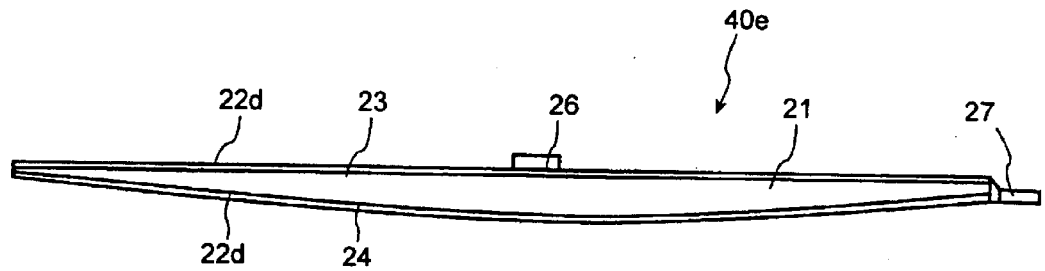
FIG. 6A is a cross-sectional view of a fourth modification of the scanning lens according to the present invention.
Figure 6B:
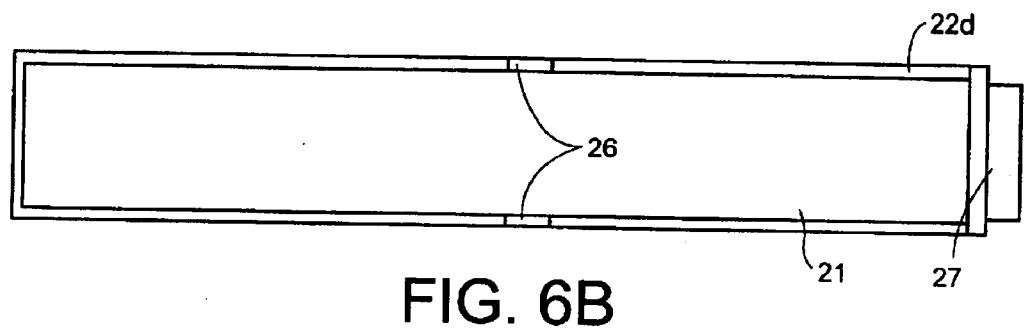
FIG. 6B is a plane view of the fourth modification of the scanning lens according to the present invention.

FIG. 6A shows a cross-sectional view of the fourth modification of the scanning lens 40a, and FIG. 6B shows a plane view of the modification. The fourth modification 40e has a characteristic shape on the light-entering side of lens frame 22d. Lens part 21 and lens frame 22d except the shape on the light-entering side of lens frame 22d can be applicable to the first embodiment, the first, the second, or the third modification. Some of the reference marks used in the embodiment or the modifications are also cited in this modification.

In scanning lens 40e, lens surface 23, which has a free curved surface, is approximately flattened. On the other hand, an outer edge of lens frame 22d of light-entering side is straight along with the main-scanning direction. Thus, the die for molding scanning lens 40e is easily produced and cost for producing lens 40e can be reduced. The light-exit side of lens frame 22d approximates the second lens surface 24.

Figure 7:
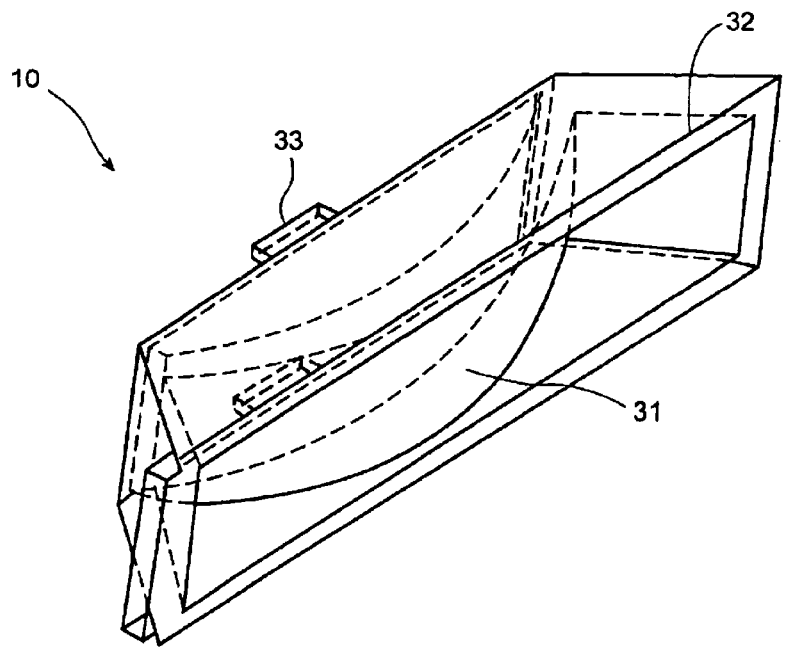
FIG. 7 is an oblique view of a known resin lens having a lens frame.
Figure 13A:
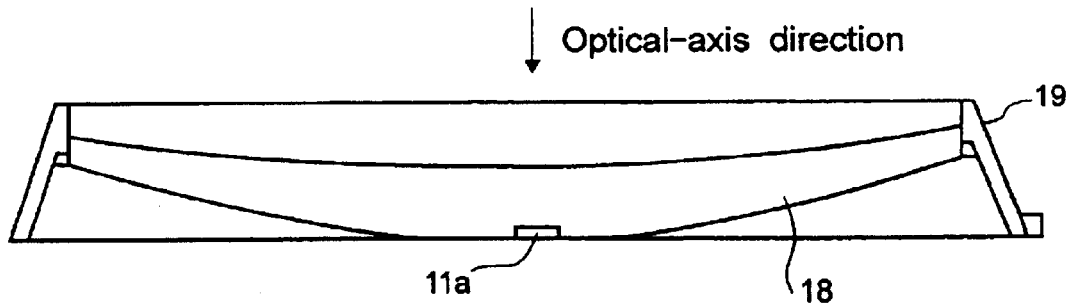
FIG. 13A is a plane view of a further another known scanning lens having a lens frame.
Figure 13B:
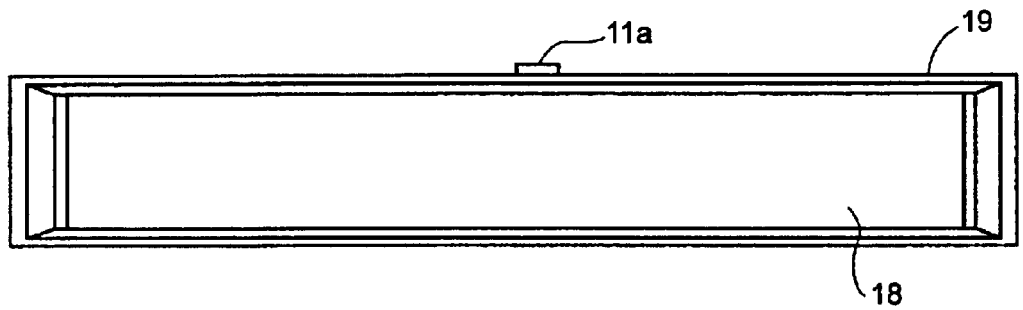
FIG. 13B is a front view of the conventional scanning lens shown in FIG. 13A.
Figure 14:
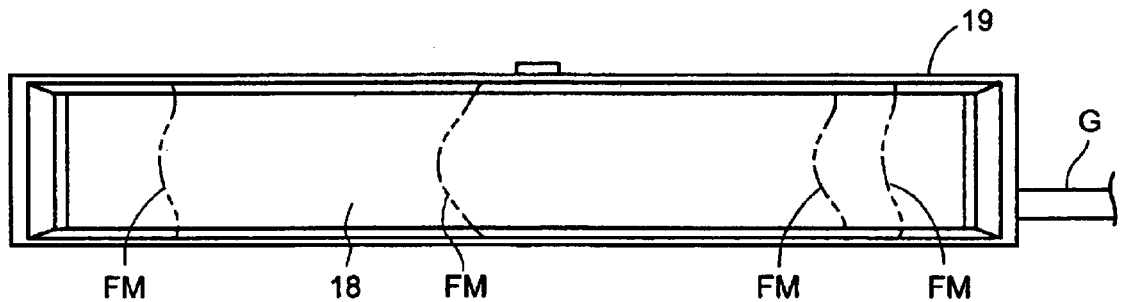
FIG. 14 shows flow marks which are produced in molding.

Next, a scanning spherical lens with positive refracting power ("theta lens 1") is described below. FIG. 7 shows an oblique view of a scanning spherical lens as a comparison example. The scanning spherical lens 10 has a shape basically the same as the scanning lens 4 shown FIG. 13A and FIG. 13B described as the known technique. Scanning lens 10 has a lens frame structure which has a lens frame 32 so as to surround lens part 31. The front shape of lens frame 32 is like trapezoidal-shape, and one side of lens frame 32 on the light-entering side is longer than the other side of frame 32 on light-exiting side. Further, positioning protrusion 33 is provided at the center in the scanning direction of lens frame 32. The scanning spherical lens 10 is positioned with the positioning protrusion 33 in assembling.

Figure 8:
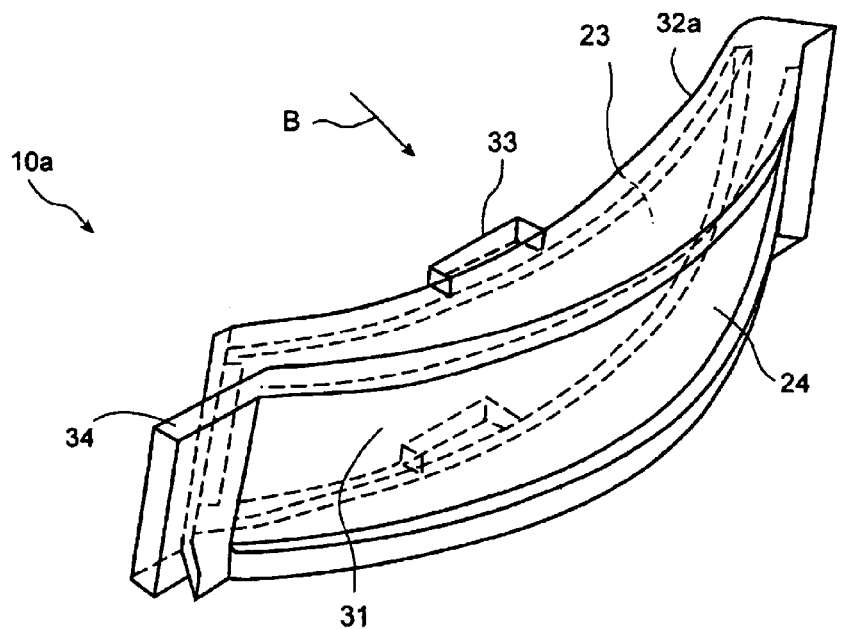
FIG. 8 is an oblique view of a fifth modification of the scanning lens according to the present invention.

FIG. 8 is an oblique view which shows the shape of a scanning spherical lens 10a (theta lens 1) as another embodiment of the present invention.

The center part of lens part 31 of lens 10a is formed thicker than the end part of lens part 31. The first lens surface 23 and second lens surface 24 of lens part 31 has constant curvatures respectively.

The front shape of lens frame 32a of lens 10a has the substantially a similar figure as the front shape of lens part 31. Lens frame 32a is a little larger than lens part 31 and has the curvature of approximately the same as a curvature of a line which approximates a centerline of the surface of lens part 31.

The curvature of lens frame 32a on the light-entering side is formed slightly smaller than the curvature of a line which makes approximation the center line of first lens surface 23, while the curvature of lens frame 32a on the light-exiting side is formed slightly larger than the curvature of a line which makes approximation the center line of second lens surface 24.

Moreover, the change of cross sectional area ratio between lens part 31 and lens frame 32a in scanning spherical lens 10a is restricted within a predetermined range between the center part and the end part in the scanning direction in the modification, too. Thus, a tip part (a front surface) of injected resin flows uniformly inside the die to fill the die with resin in the molding process. Consequently, lens part 31, which is a part of the molded article, is prevented from causing a flow mark and rapid change of internal strain. As a result, a lens with good optical characteristics is provided.

Moreover, an end part 34 having a surface that is parallel to the scanning direction is formed at the end part (or both the parts) of lens frame 32a. Using end part 34 as a guide surface, in assembling, the scanning spherical lens 10a positions lens part 31 with optical accuracy, because the surface is orthogonal or perpendicular to the optical-axis direction (allow mark B).

A positioning protrusion 34 is provided at the center part of lens frame 32a in the scanning direction. Positioning protrusion 33 is provided not to project from lens frame 32. Thus, the height of scanning lens in the optical-axis direction depends on the height of lens frame 32, which makes it possible to reduce height of lens unit of scanning spherical lens 10a. Therefore, both downsizing of scanning lens 10a and accurate positioning of scanning lens 10a are made possible.

Further, making use of both end parts 34 provided at the end part of lens frame 32a and positioning protrusion 33 as guides makes the lens position with more accuracy. Making the height of projection 33 the same as the height of end parts 34 provided at end parts of lens frame 32a simplifies the structure of housing to which the scanning lens 10a is attached. Using end part 34 and positioning protrusion 33 as guides in assembling makes much accurate positioning of lens.

The light-entering side of the lens 10a is formed in accordance with the curvature of the first lens surface 23, while the light-exit side or light-outputting side of second lens surface 24 and lens frame 32a may be formed into a flat surface. Thus, the die for the lens 10a can be easily produced and cost for producing lens can be reduced.

Further another, one embodiment of an optical scanning device according to the invention is explained.

Figure 9:
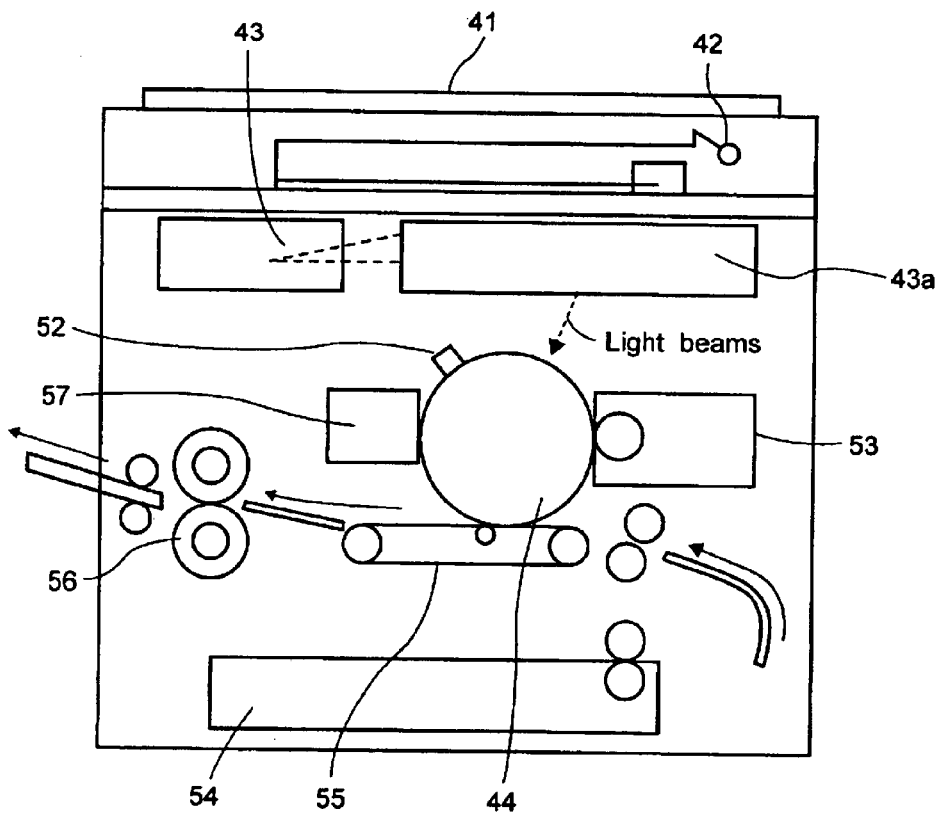
FIG. 9 is a side sectional view showing an outline structure of an electronic copier using the present invention.
Figure 10:
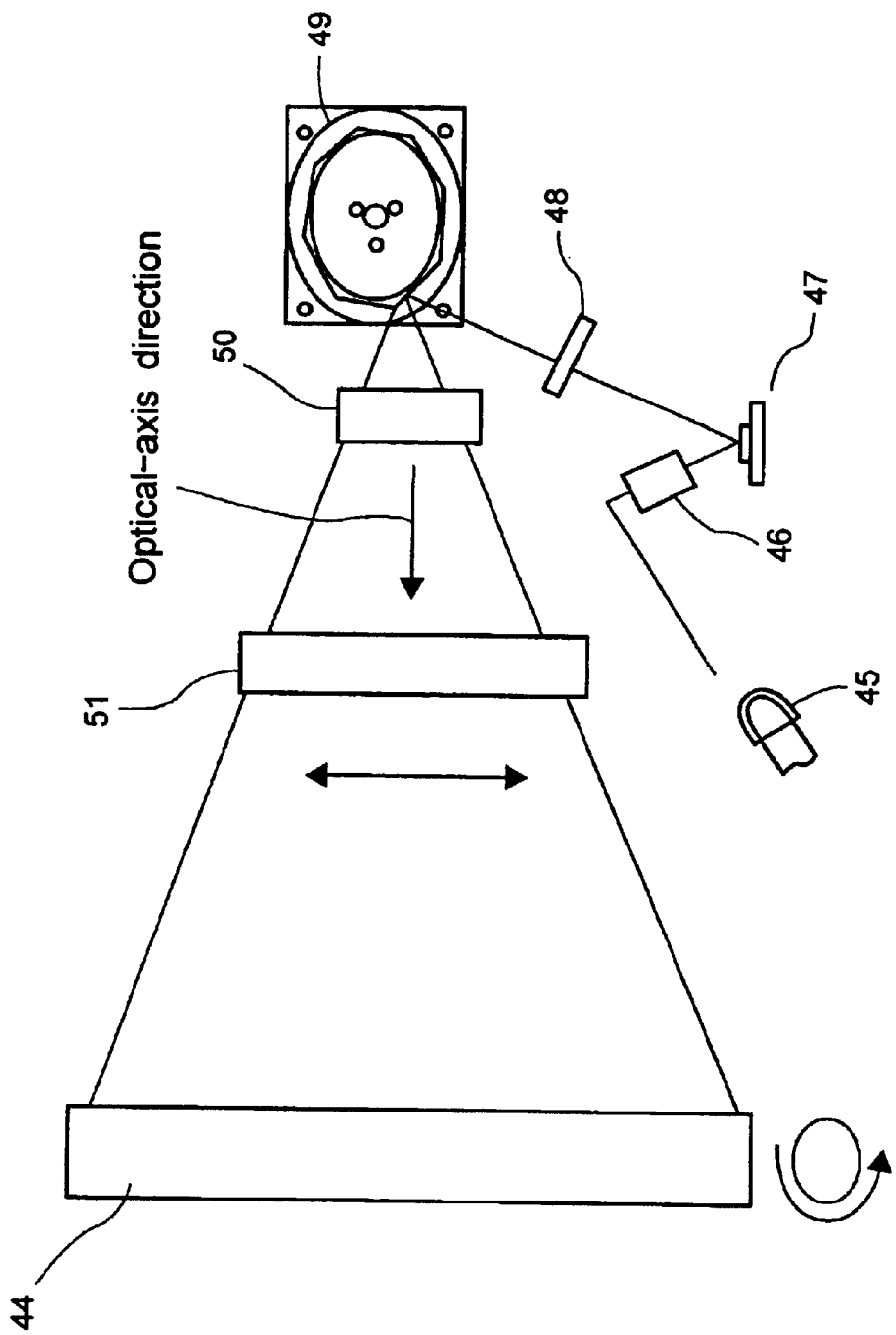
FIG. 10 is a plane view of an optical scanning device according to the present invention.

FIG. 9 is a side sectional view showing an outline structure of an electronic copier. FIG. 10 shows a plane view of the optical system which constitutes the electronic copier.

As shown in FIG. 9, a scanner 42 with a light source (not shown) moving along an original platen 41 is provided below original platen 41 on which an original copy is placed. An image processing part 43 which digitally processes the reflection light from the original copy exposed by scanner 42 and a laser optical system is placed under scanner 42. As shown in FIG. 10, the laser optical system applies the digital optical signals processed at image processing part 43 to a photosensitive drum 44. For this purpose, a laser diode 45, a collimate lens 46, a reflection mirror 47, a cylindrical lens 48, a polygon mirror 49, a f-theta lens 50 and a f-theta lens 51 are serially arranged on the optical axis in the progressing direction of the light. In this case, the afore-mentioned scanning lens 40a, 40b, 40c, 40d or 40e may be applicable to f-theta lens 50 and 51.

Photosensitive drum 44 has a predetermined electrostatic potential as a surface potential by being charged uniformly by a charger 52 in advance. The resistance value of the area exposed by laser diode 45 is reduced. It is because the photosensitive body on photosensitive drum 45 is a photo-conductive material, which lowers the surface potential of the area since the surface charges flows to ground at the back surface of photosensitive drum 44. Consequently, an electrostatic latent image is formed by the electrostatic potentials made by light exposure.

Photosensitive drum 44 rotates, and magnetic developers (toners) are supplied to the electrostatic latent image by a fur brush, etc. at a development section provided around photosensitive drum 44. Consequently, a development is executed by optionally attracting the developers corresponding to the electronic latent image.

A cleaner 57 to clean photosensitive drum 44 is provided around photosensitive drum 44.

The original copy is transferred synchronously with the rotation of photosensitive drum 44 from a paper feed cassette to belt transfer part arranged around a photosensitive drum 44. Then, a high voltage is applied to the original copy from the back surface of the original copy at the belt transfer part.

Therefore, the developers of developed image formed on the surface of photosensitive drum are sucked/transferred to the original copy. A roll heater of fix device 56 heats and fixes the developers of the image transferred on the surface of the original copy.

In the electronic copier above, visualizing process is executed after image processing part 43 digitally processes input signals from the original copy, while in case of a laser printer, input digital signals from an original may be transmitted to an optical system. An optical path after the optical system is like the same as the electronic copier.

In the electronic copier or laser printer, the optical system can be assembled with excellent accuracy because the optical scanning system or the lens mentioned above is assembled.

Numerous modifications and modifications of the present invention are possible in light of the above teachings. It is therefore to be understood that, within the scope of the appended claims, the present invention can be practiced in a manner other than as specifically described herein.

What is claimed is:

1. A scanning lens comprising:
   a first lens surface for receiving a light beam;
   a second lens surface for emitting the light beam;
   a first lens frame that projects an approximately constant amount from a substantial part of the periphery of the first lens surface along a main scanning direction of the scanning lens; and
   a second lens frame that projects from a periphery of the second lens surface,
   wherein one of the first and second lens frames projects no more than 2 mm.

2. A scanning lens according to claim 1, wherein the second lens frame projects from the second lens surface projects an approximately constant amount.

3. A scanning lens according to claim 2, wherein one of the first and second lens surfaces forms an approximately free-curved surface.

4. A scanning lens according to claim 3, wherein an outer edge of the one of the first and second lens frames forms a curved line having an approximately constant curvature along the main scanning direction and the outer edge of the one of the first and second lens frames has an inflection point near a center of the scanning lens in the main-scanning direction.

5. A scanning lens according to claim 3, wherein an outer edge of the one of the first and second lens frames forms an approximately curved line which is represented by higher order polynomials.

6. A scanning lens according to claim 3, wherein the free curved surface is approximately flat, and the one of the first and second lens frames is approximately straight along the main scanning direction.

7. A scanning lens according to claim 1 further comprising:
   an end part provided on an end of the scanning lens in the main scanning direction, the end part having a flat surface orthogonal to the optical axis.

8. A scanning lens according to claim 1 further comprising:
   a positioning protrusion on the scanning lens, the positioning protrusion having a surface orthogonal to an optical axis of one of the first and second lens surfaces.

9. A scanning lens according to claim 8 wherein, the positioning protrusion is near a center, in the main scanning direction, of the scanning lens and is between a periphery of one of the first and second lens surface and a plane including opposite end points, in the main scanning direction, of the one of the first and second lens surfaces.

10. A scanning lens according to claim 1 further comprising:
    a lens part adjacent the first lens surface and first lens frame, wherein a change of perpendicular cross-sectional area ratio between the lens part and the lens frame is restricted within a predetermined range in the main scanning direction.

11. An optical scanning device for producing image information, the device comprising:
    a light source which emits a light beam;
    a scanning element which scans the light beam;

a scanning lens which refracts the light beam, the scanning lens having a first lens surface;

a first lens frame that projects an approximately constant amount from a substantial part of the periphery of the first lens surface; and a lens part adjacent the first lens surface and first lens frame, wherein the lens part and the first lens frame include resin and wherein a change of perpendicular cross-sectional area ratio between the lens part and the first lens frame is restricted within a predetermined range in the main-scanning direction.

12. An optical scanning device according to claim 11 further comprising:

a second lens frame that projects an approximately constant amount from a substantial part of the periphery of the second lens surface along a main scanning direction of the scanning lens, wherein the scanning element is a mirror.

13. An optical scanning device according to claim 11, wherein one of the first and second lens surfaces forms an approximately free-curved surface and an outer edge of one of the first and second lens frames projecting from the one of the first and second lens surfaces projects an approximately constant amount and forms a curved line of an approximately constant curvature along the main-scanning direction of the scanning lens.

14. An optical scanning device according to claim 11 further comprising:

an end part provided on an end of the scanning lens in the main scanning direction, the end part having a flat surface orthogonal to the optical axis.

15. A method of making a scanning lens comprising:

forming a lens part having a first lens surface and a second lens surface;

forming a first lens frame to project an approximately constant amount from a substantial part of the periphery of the first lens surface along a main scanning direction;

forming a second lens frame to project from the periphery of the second lens surface;

forming the lens part and the first lens frame using resin; and restricting within a predetermined range a change of a cross-sectional area ratio, which is perpendicular to the main scanning direction, between the lens part and the first lens frame.

16. A method of making a scanning lens according to claim 15, wherein one of the first and second lens surfaces is an approximately free-curved surface and an outer edge of one of the first and second lens frames projecting front the one of the first and second lens surfaces projects an approximately constant amount and forms a curved line of an approximately constant curvature along the main-scanning direction.

17. A method of making a scanning lens according to claim 15 further comprising:

forming an end part on an end of the scanning lens in the main scanning direction, the end part having a flat surface orthogonal to the optical axis.

18. A method of making a scanning lens according to claim 15 further comprising:

forming an outer edge of the first lens frame to be generally parallel to and smoother than the substantial part of the periphery of the first lens surface.

* * * * *